May 12, 1931.　　　J. W. WOODRUFF　　　1,804,582
PRESSURE GREASING APPARATUS
Filed Aug. 11, 1927
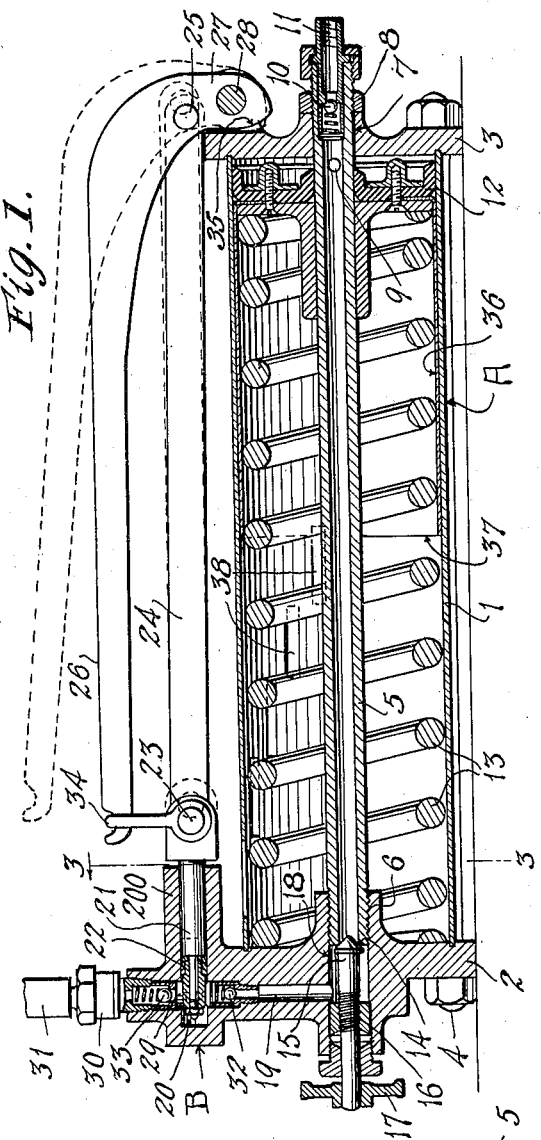
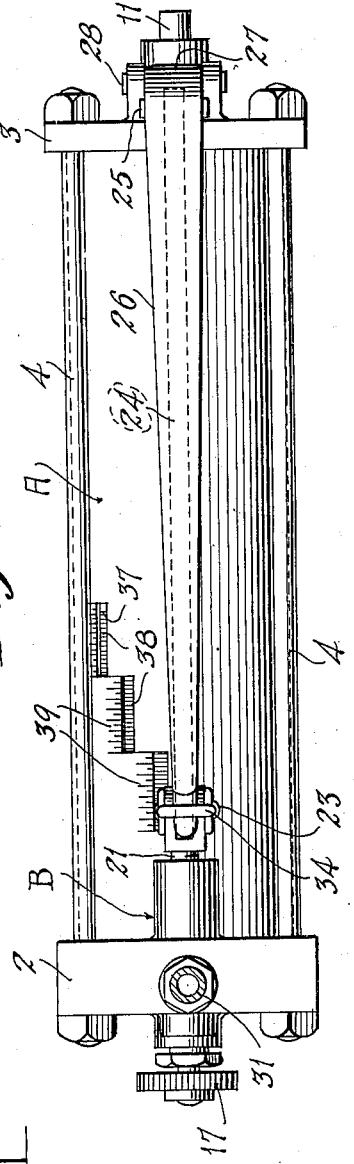
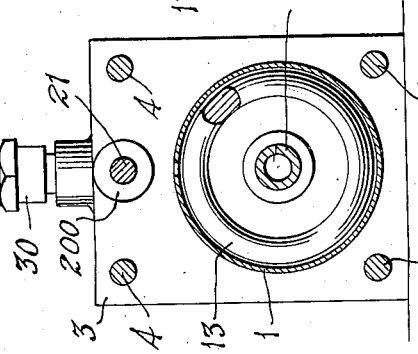
INVENTOR
Joseph W. Woodruff,
BY
Everett Cook,
ATTORNEYS.

Patented May 12, 1931

1,804,582

UNITED STATES PATENT OFFICE

JOSEPH W. WOODRUFF, OF ELIZABETH, NEW JERSEY

PRESSURE GREASING APPARATUS

Application filed August 11, 1927. Serial No. 212,243.

This invention relates in general to pressure greasing apparatus, and more particularly to such apparatus including a reservoir for the grease and a manually operated grease ejecting pump which communicates with said reservoir, whereby the grease may be ejected from the reservoir at high pressures, for example four thousand (4000) pounds.

One object of the invention is to provide pressure greasing apparatus of the character described embodying novel and improved features of construction, whereby the grease may be ejected at said high pressures with a minimum of manual exertion by the operator.

Another object is to provide a novel and improved construction, combination and arrangement of parts, whereby a compact and easily handled apparatus of the character described composed of a minimum number of parts is produced.

Further objects are to provide such a pressure greasing apparatus including novel and improved means for charging the grease reservoir; to provide novel and improved means for constantly forcing the grease from said reservoir into the ejecting pump, said means also serving to actuate the pump on its return stroke, whereby the operator is relieved of the exertion necessary to force the grease from the reservoir to the pump and the actuation of the pump on its return stroke; to provide a strong and easily assembled construction, and to obtain other advantages and results as will be brought out by the following description.

Referring to the accompanying drawings, in which corresponding and like parts are designated throughout the several views by the same reference characters, Figure 1 is a vertical longitudinal sectional view through a pressure greasing apparatus embodying my invention;

Figure 2 is a top plan view of the apparatus, and

Figure 3 is a transverse vertical sectional view, taken on the line 3—3 of Figure 1.

Specifically describing the illustrated embodiment of the invention, the reference character A designates the grease reservoir and B the ejecting pump. The reservoir comprises a cylinder 1 to opposite ends of which are secured heads 2 and 3, said heads being preferably substantially square and being connected by tie bolts 4, whereby the heads are firmly secured to the cylinder. Extending longitudinally of the cylinder and centrally thereof is a pipe 5 having one end thereof screw threaded at 6 into one head of the cylinder, and the other end passing through an opening 7 in the opposite head 3. A jam nut 8 is threaded upon the end of said pipe 5 projecting beyond the head 3 and is clamped tightly against said head. Said pipe 5 has transverse ports 9 communicating with its interior passage adjacent the inside of the head 3, and the extremity of the pipe 8 has secured therein an inwardly opening spring closed check valve 10 and a nipple 11 to which may be connected a hose or pipe for charging the reservoir with grease. A packed piston 12 is slidable upon the pipe 5 within the cylinder 1 and is normally influenced toward the head 3 by a heavy helical compression spring 13 interposed between the piston and the head 2. The end of the pipe 5 opposite the check valve 10 is formed with a valve seat 14 with which cooperates a needle valve 15 threaded at 16 in the head 2 and provided at its outer end with an operating handle 17. This valve 15 serves to open and close the passage through the pipe 5.

In charging the reservoir the valve 15 is closed and a tube or hose is connected to the nipple 11. Grease is then pumped by any suitable means into the pipe 5 through the transverse passages 9 and into the space between the piston 12 and the head 3. The pressure is sufficient to compress the spring 13 as the grease enters the cylinder. The spring 13 is preferably of sufficient strength to exert a pressure of for example two hundred (200) pounds, so that when the cylinder is fully charged the piston 12 and the spring 13 tend to force the grease through the pipe 5 toward the valve 15 under a high pressure.

The head 2 has an axial passage 18 surrounding the valve 15 and communicating with the passage in the pipe 5, and another passage 19 which extends substantially radially through the head. The passage 19 leads to a pump cylinder 20 which may be cast integral with the head 2 and is disposed at substantially right angles to the passage 19, or parallel to the axis of the cylinder 1 with one end opening outwardly through a boss 200 on the head 2. Within the pump cylinder 20 is reciprocable a piston or plunger 21 having a packing cup 22 thereon, one end of said piston projecting outwardly from the open end of the cylinder and being pivotally connected at 23 to one end of a thrust link 24 the other end of which is pivotally connected as at 25 to an operating lever 26. This operating lever preferably has one end 27 disposed at an angle to the body of the lever and its extremity pivotally connected as at 28 to the head 3 of the cylinder 1, so that the body or long arm of the lever may be normally disposed parallel to and in close proximity to the cylinder 1. The pivotal connection 25 is disposed in the bent end 27 closely adjacent the pivot 28, so as to obtain the most efficient leverage, or in other words, to enable the greatest pressure to be exerted on the piston 21 with a relatively small pressure on the body of the lever 26. The pump cylinder 20 is formed with an outlet 29 in substantial alinement with the inlet passage 19, and a nipple 30 is connected to said outlet to which may be connected a hose or the like 31 for conveying the grease to a desired point. The passage 19 is provided with a spring check valve 32 which closes in the direction away from the cylinder 20, while the outlet passage 29 has a spring check valve 33 which closes in the direction of said cylinder. A tie link or other suitable means 34 is provided for separably connecting the lever 26 to the link 24 to hold said lever in inoperative position alongside of the cylinder.

In operation of the apparatus, assuming the reservoir charged with grease, the tie link 34 is released from the lever 26 and the valve 15 is opened. The grease is then forced under pressure by the spring 13 and piston 12 through the passages 18 and 19 into the pump cylinder 20 behind the packing 22, this pressure forcing the piston 21 outwardly and swinging the lever 26 into the dotted position shown in Figure 1. Movement of the lever 26 in this direction and consequently movement of the piston 21, are limited by engagement of a flat portion 35 on the pivoted end of the lever with the outside of the head 3. If the resistance to the flow of grease through the outlet hose 31 is less than the pressure exerted by the spring 13, the grease will flow through the hose 31. However, in most instances a much greater pressure than that exerted by the spring 13 is required to force the lubricant into a bearing, and accordingly in such cases the operator pushes the handle 26 toward the reservoir. This action forces the piston 22 inwardly of the pump cylinder 20 which ejects the grease from said cylinder behind the piston through the outlet passage 29 under an extremely high pressure, for example four thousand (4000) pounds. It is necessary for the operator to use less than one hundred (100) pounds pressure on the lever 20 to accomplish this result. Upon release of the lever the pressure of the grease flowing from the reservoir 1 acts upon the piston 21 to again swing the lever 26 outwardly into the dotted line position, whereupon the manual operation by the operator to eject the grease through the hose 31 may be repeated. Preferably the apparatus is set upon a floor near the machine to be lubricated with the lever 26 uppermost, the square heads 3 holding the apparatus against rolling. In this position the operator may actuate the lever 26 with his foot which is a less tiresome operation than that of swinging the lever 26 by hand. When it is desired to place the apparatus out of operation for any appreciable length of time, the valve 15 is closed which confines any possible leakage of the grease to the reservoir 1 and relieves the hose 31 from pressure.

In practice, a suitable control valve would be used at the extremity of the hose 31 for regulating the flow of grease therefrom, for example such a valve as shown in my copending application Serial No. 200,532, filed June 22, 1927.

Preferably indicating means is provided for showing at all times the quantity of grease in the reservoir. This means may comprise a tube 36 connected to the piston 12 and slidably engaging the inner walls of the cylinder 1 on the same side of the piston as the spring 13, the free edge 37 of said tube cooperating with slots 38 in the wall of the cylinder 1 through which said edge is visible. The edges of the slots on the exterior of the cylinder may be graduated as at 39 to indicate the amount of grease which is used on any particular operation.

I am aware that the general combination of a reservoir for grease and an ejecting pump is not new, but my particular construction above described has many results and advantages not obtainable with the constructions heretofore known. However, the detail construction of my apparatus may be modified and changed by those skilled in the art without departing from the spirit or scope of the invention, and therefore I do not desire to be understood as limiting myself except as required by the following claims when construed in the light of the prior art.

Having thus described the invention, what I claim is:

1. Apparatus of the character described, comprising a reservoir for grease including a cylinder having an outlet extending at substantially right angles to its axis at one end thereof, a manually operable pump including a cylinder disposed axially parallel to said cylinder at one side thereof and having an inlet communicating with said outlet of the cylinder, said pump cylinder also having an outlet passage, a piston reciprocable in said pump cylinder, an operating lever having two angularly disposed arms of different lengths, means for pivotally connecting the outer end of the shorter arm to the end of said cylinder opposite said pump cylinder with the longer arm normally disposed substantially parallel to and adjacent said cylinder, and a link having one end pivotally connected to said piston and the other end articulated to the inner end of said short arm of said lever and disposed between said long arm of said lever and said cylinder.

2. Apparatus of the character described, comprising a reservoir for grease including a cylinder, a pipe extending longitudinally thereof with one end projecting from one end of said cylinder, a piston slidable longitudinally of the cylinder, a spring for moving said piston toward the first-mentioned end of said cylinder, said pipe communicating with said cylinder between said end thereof and said piston, an outlet at the other end of said cylinder communicating with said pipe and extending at substantially right angles to the axis of the cylinder, a pump having a cylinder on the second-mentioned end of said reservoir cylinder substantially parallel with the axis of the cylinder at one side thereof and having an inlet communicating with said outlet of the cylinder, said pump cylinder also having an outlet passage, a piston reciprocable in said pump cylinder, an operating lever having two angularly disposed arms of different lengths, means for pivotally connecting the outer end of the shorter arm to the end of said cylinder opposite said pump cylinder with the longer arm normally disposed substantially parallel to and adjacent said cylinder, and a link having one end pivotally connected to said piston and the other end articulated to the inner end of said short arm of said lever and disposed between said long arm of said lever and said cylinder.

3. Apparatus for the character described, comprising a cylindrical reservoir for grease, a pipe extending longitudinally thereof with one end projecting from one end of the reservoir, a piston slidable longitudinally of the reservoir, a spring for moving said piston toward the first-mentioned end of said reservoir, said pipe communicating with said reservoir between said end thereof and said piston, an outlet at the other end of said reservoir communicating with said pipe, and means for controlling flow of grease from said outlet, a pump including a cylinder formed on the end of said reservoir adjacent said outlet and having an inlet and a discharge passage, said inlet communicating directly with the outlet of said reservoir, a plunger reciprocable within said cylinder to force grease therefrom through said discharge passage, a check valve for preventing flow of grease from said cylinder into said outlet, and means for moving said plunger in one direction to eject said grease, said pump inlet and said reservoir outlet being arranged at the working side of the pump plunger at all times and the pressure exerted by said spring pressed piston in the reservoir being of a magnitude to cause the grease flowing from said reservoir to move said plunger in the other direction.

JOSEPH W. WOODRUFF.